US008345970B2

(12) United States Patent
Hang et al.

(10) Patent No.: US 8,345,970 B2
(45) Date of Patent: *Jan. 1, 2013

(54) IMAGE PROCESSING APPARATUS, IMAGE PROCESSING METHOD, AND IMAGE PROCESSING PROGRAM STORED ON A COMPUTER READABLE MEDIUM

(75) Inventors: Fu Hang, Kanagawa (JP); Jun Enomoto, Kanagawa (JP); Takafumi Matsushita, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 1005 days.

This patent is subject to a terminal disclaimer.

(21) Appl. No.: 12/294,993

(22) PCT Filed: Mar. 27, 2007

(86) PCT No.: PCT/JP2007/057366
§ 371 (c)(1),
(2), (4) Date: Feb. 2, 2009

(87) PCT Pub. No.: WO2007/114415
PCT Pub. Date: Oct. 11, 2007

(65) Prior Publication Data
US 2010/0177960 A1 Jul. 15, 2010

(30) Foreign Application Priority Data
Mar. 31, 2006 (JP) ................................ 2006-099581

(51) Int. Cl.
*G06K 9/00* (2006.01)
(52) U.S. Cl. ........ 382/167; 382/163; 382/190; 382/275; 382/164; 382/203; 358/518; 358/528; 358/531
(58) Field of Classification Search .................. 382/167, 382/162, 203, 282, 283, 274, 117, 118, 254, 382/275, 115, 165, 173; 348/224.1, 225, 348/576, 577, 578, 579, 580, E09.037; 358/518–523, 531, 527, 530
See application file for complete search history.

(56) References Cited

U.S. PATENT DOCUMENTS
7,024,035 B1 * 4/2006 Enomoto ...................... 382/167
(Continued)

FOREIGN PATENT DOCUMENTS
JP 07-013274 A 1/1995
(Continued)

OTHER PUBLICATIONS

Solidus, "Changing Eye Color, ~Tutorial by Solidus", this document is found from internet, the URL is <http://s4.invisionfree.com/SvDesigns/index.php?showtopic=49>, and posted on Jan. 16, 2005, pp. 7.*

(Continued)

*Primary Examiner* — Matthew Bella
*Assistant Examiner* — Mekonen Bekele
(74) *Attorney, Agent, or Firm* — Sughrue Mion, PLLC (57) ABSTRACT

An image processing apparatus includes a red eye candidate detecting section, a red eye-gold eye separating section, a gold eye converting section, and a red eye correcting section. Herein, the red eye candidate detecting section detects a red eye candidate included in images. The red eye-gold eye separating section judges whether a red eye candidate detected by the red eye candidate detecting section is either red eye or a gold eye respectively specified in a predetermined color range. The gold eye converting section converts a color of the red eye candidate, which was judged as red eye by the red eye-gold eye separating section, into a color, which is judged as a red eye by the red eye-gold eye separating section. The red eye correcting section performs a red eye correction to a color of the red eye candidate converted by the gold eye converting section.

10 Claims, 7 Drawing Sheets

U.S. PATENT DOCUMENTS

| | | | |
|---|---|---|---|
| 7,127,108 B2* | 10/2006 | Kinjo et al. | 382/203 |
| 7,277,589 B2* | 10/2007 | Enomoto | 382/254 |
| 7,415,165 B2* | 8/2008 | Itagaki et al. | 382/282 |
| 8,018,612 B2* | 9/2011 | Matsushita et al. | 358/1.15 |
| 2003/0068084 A1* | 4/2003 | Kinjo et al. | 382/164 |
| 2003/0086134 A1* | 5/2003 | Enomoto | 358/538 |
| 2004/0070598 A1* | 4/2004 | Enomoto | 345/732 |
| 2004/0109614 A1* | 6/2004 | Enomoto et al. | 382/275 |
| 2005/0174359 A1* | 8/2005 | Yu | 345/589 |
| 2005/0232490 A1* | 10/2005 | Itagaki et al. | 382/190 |
| 2007/0182997 A1* | 8/2007 | Demandolx et al. | 358/3.26 |
| 2008/0095445 A1* | 4/2008 | Brandt | 382/203 |
| 2009/0238454 A1 | 9/2009 | Hang et al. | |

FOREIGN PATENT DOCUMENTS

| | | |
|---|---|---|
| JP | 2000-076427 A | 3/2000 |
| JP | 2000-137788 A | 5/2000 |
| JP | 2001-069333 A | 3/2001 |
| JP | 2004-118319 A | 4/2004 |
| JP | 2004-145287 A | 5/2004 |
| JP | 2005-286830 A | 10/2005 |
| JP | 2006-040230 A | 2/2006 |
| JP | 2007-274526 A | 10/2007 |

OTHER PUBLICATIONS

Jennifer Farley, Photoshop Tutorial, Using Solid Colour Layers | Design, Illustration & Photoshop, pp. 4, Posted Jun. 21, 2006 in Photoshop Tutorials, http://www.laughing-lion-design.com/2006/06/photoshop-tutorial-using-solid-colour-layers/.*

Changing Eye Color, Tutorial by Solidus, this document is found from internet, the URL of this tutorial is: /s4.invisionfree.com/SvDesigns/index.php?showtopic=49>, and posted on Jan. 16, 2005, and contain 7pages.*

International Search Report for corresponding Intern'l. Appl. No. PCT/JP2007/057366, mailed Jun. 26, 2007, 2 pages in English.

JP Communication, dated Mar. 16, 2010, issued in corresponding JP Application No. 2006-099581, 2 pages with partial English translation.

* cited by examiner

| BRIGHTNESS OF GOLDEN EYE | CONVERSION VALUE TO RED EYE | | |
|---|---|---|---|
| | R COMPONENT | G COMPONENT | B COMPONENT |
| BRIGHTNESS 600 | +△△% | -××% | -○○% |
| BRIGHTNESS 610 | +□□% | -▽▽% | -◇◇% |
| ⋮ | ⋮ | ⋮ | ⋮ |

IMAGE PROCESSING APPARATUS, IMAGE PROCESSING METHOD, AND IMAGE PROCESSING PROGRAM STORED ON A COMPUTER READABLE MEDIUM

TECHNICAL FIELD

The present invention relates to an image processing apparatus, an image processing method, and an image processing program stored on a computer readable medium. Particularly, the present invention relates to an image processing apparatus, an image processing method, and an image processing program stored on a computer readable medium for separating a gold eye from a red eye, and performing a red correcting process to the separated gold eye. This patent application incorporates herein by reference the contents of Japanese Patent Application No. 2006-099581 filed on Mar. 31, 2006, if applicable.

BACKGROUND ART

In the case that a subject person is photographed by using a flash lamp, there is the possibility that a red or gold pupil of the subject person would appear in a photograph; namely, a red-eye effect or gold-eye effect would be caused. Due to this fact, the captured subject person is not a well looking. Accordingly, a method for correcting such red-eye or the gold-eye to an original pupil color has been proposed in diverse ways. A method has been disclosed, for example, in Japanese Patent Application Publication No. 2000-76427, such that a necessary area as the correcting object areas including a bloc color defective areas such as red eye areas is designated by user, then all pixels of the red-eye are corrected based on a color value determined by a hue, a color saturation, and a lightness of the necessary area designated by user. Furthermore, a method has been disclosed as, for example, in Japanese Patent Application Publication No. 2004-145287, such that a an image-capturing information such as stroboscope information, Ev value, shutter speed, and lens diaphragm is added to an optically taken picture, and possibility that a red-eye effect is caused is decided by using the an image-capturing information is performed, then the picture is served to the red-eye effect compensating processing only when there is the possibility the red-eye effect is caused. Additionally, a method has been disclosed as, for example, in Japanese Patent Application Publication No. 2000-137788, such that a face candidate area considered to correspond to the face of the human is extracted from an image to be processed, the face candidate area is divided into a specific number of blocks, and then a feature value found for each block are collated with patterns for matching found by dividing the face area actually corresponding the face of the human in order to extract a face candidate area as a face area corresponding to the face of human.

Furthermore, a method has been disclosed as, for example, in Japanese Patent Application Publication No. 2000-137788, such that when a color density of an area corresponding to a face of a human extracted from an image is equivalent to a predetermined threshold value, a body candidate area is extracted from images, then accuracy as a face area (a face candidate area is surely a face image.) is evaluated to each face candidate area by use of a density and a color saturation in the face or the body candidate area in order to extract a face candidate area as a face area corresponding to the face of human. Moreover, a method has been disclosed as, for example, in Japanese Patent Application Publication No. 2000-137788, such that plural face candidate areas estimated to be equivalent to a face of human are extracted from images, and overlap degree is calculated for a pair of face candidate areas which overlap each other, then accuracy as a face area is evaluated based on the overlap degree in order to extract a face candidate area as a face area corresponding to the face of human.

DISCLOSURE OF THE INVENTION

Problems to be Solved by the Invention

In the above mentioned invention disclosed in Japanese Patent Application Publication No. 2000-76427, together with Japanese Patent Application Publication No. 2004-145287, a red eye correction is equally performed to both a red eye and a gold eye without judging a detected red eye candidate as the eye or the gold eye. In this case, accordingly, there is possibility that user senses a discomfort at images performed by the above red eye correction when he or she saw the images.

Therefore, it is an object of the present invention to provide an image processing apparatus, an image processing method, and an image processing program stored on a computer readable medium, which is capable of overcoming the above drawbacks. The above and other objects can be achieved by combinations described in the independent claims. The dependent claims define further advantageous and exemplary combinations of the present invention.

Means for Solving the Problems

According to the first aspect of the present invention, an image processing apparatus includes a red eye candidate detecting section, a red eye-gold eye separating section, a gold eye converting section, and a red eye correcting section. Herein, the red eye candidate detecting section detects a red eye candidate included in images. The red eye-gold eye separating section judges whether a red eye candidate detected by the red eye candidate detecting section is either red eye or a gold eye respectively specified in a predetermined color range. The gold eye converting section converts a color of the red eye candidate, which was judged as red eye by the red eye-gold eye separating section, into a color, which is judged as a red eye by the red eye-gold eye separating section. The red eye correcting section performs a red eye correction to a color of the red eye candidate converted by The gold eye converting section.

Furthermore, the red eye correcting section may equally perform a red eye correction to two red eye candidates. Of these, one is a red eye candidate which was judged as a red eye by the red eye-gold eye separating section, while the other is a red eye candidate of which color was converted by a gold eye converting section since the red eye candidate was judged as a gold eye by the red eye-gold eye separating section. Additionally, an image processing apparatus may further include an ideal red eye-converted value-storage section and a brightness acquiring section. Herein, the ideal red eye-converted value-storage section stores a conversion value of a color in accordance with a brightness of a red eye candidate which was judged as a gold eye by the red eye-gold eye separating section. The brightness acquiring section acquires a brightness of a red eye candidate which was judged as a gold eye by the red eye-gold eye separating section. The gold eye converting section may convert a color of the red eye candidate, which was judged as a gold eye by the red eye-gold eye separating section, into a color, which is judged as a red eye by the red eye-gold eye separating section by use of a conversion value of a color stored in the ideal red eye-converted value-storage section in accordance with a brightness acquired by a brightness acquiring section.

Moreover, the red eye candidate detecting section may detect a red eye candidate from images by using a predetermined detecting threshold. Herein, the red eye candidate has a red included in a predetermined color range. The predetermined detecting threshold detects a red. The red eye-gold eye separating section may judge whether a red eye candidate detected by the red eye candidate detecting section is either red eye or a gold eye by using a red eye separating threshold value of which level of R component in proportion to at least one of G component and B component is higher than a detecting threshold value. The red eye-gold eye separating section may judge whether a red eye candidate detected by a red eye candidate detecting section is either red eye or a gold eye based on at least one of a first feature value, a second feature value, or a third feature value. Herein, the first feature value indicates a ratio of an average value of G component level in proportion to a sum total of an average value of R component level, G component level, and B component level of pixels included in the red eye candidate detected by the red eye candidate detecting section. The second feature value indicates an average value of pixels of R component level included in the red eye candidate detected by the red eye candidate detecting section. The third feature value indicates a dispersion of R component level of pixels included in the red eye candidate detected by the red eye candidate detecting section.

What is more, the red eye-gold eye separating section may judge that a red eye candidate detected by a red eye candidate detecting section is a gold eye in the case that the first feature value is greater than a predetermined first threshold value, and the second feature value is greater than a predetermined second threshold value. The red eye-gold eye separating section may judge that a red eye candidate detected by a red eye candidate detecting section is a gold eye in the case that the first feature value is smaller than a predetermined first threshold value, and the third feature value is smaller than a predetermined third threshold value. The red eye-gold eye separating section may judge that a red eye candidate detected by a red eye candidate detecting section is a red eye in the case that the first feature value is greater than a predetermined first threshold value, the second feature value is smaller than a predetermined second threshold value, and the third feature value is smaller than a predetermined third threshold value.

According to the second aspect of the present invention, an image processing method includes a step of detecting a red eye candidate, a step of separating a red eye from a gold eye, a step of converting a gold eye into a red eye, and a step of correcting a red eye. Herein, the step of detecting a red eye candidate detects a red eye candidate included in images. The step of separating a red eye from a gold eye judges whether a red eye candidate detected in the step of detecting a red eye candidate is a red eye or a gold eye respectively specified in a predetermined color range. The step of converting a gold eye into a red eye converts a color of the red eye candidate, which was judged as a red eye in the step of separating a red eye from a gold eye, into a color, which is judged as a red eye in the red eye-gold eye separating section. The step of correcting a red eye performs a red eye correction to a color of the red eye candidate converted in the step of converting a gold eye into a red eye.

According to the third aspect of the present invention, an image processing program stored on a computer readable medium for the image processing apparatus, which applies image processing to image, allows the image processing apparatus to functions as a red eye-gold eye separating section, a gold eye converting section, and a red eye correcting section. Herein, the red eye-gold eye separating section judges whether a red eye candidate detected by the red eye candidate detecting section is either red eye or a gold eye respectively specified in a predetermined color range. The gold eye converting section converts a color of the red eye candidate, which was judged as red eye by the red eye-gold eye separating section, into a color, which is judged as a red eye by the red eye-gold eye separating section. The red eye correcting section performs a red eye correction to a color of the red eye candidate converted by the gold eye converting section.

The summary of the invention does not necessarily describe all necessary features of the present invention. The present invention may also be a sub-combination of the features described above.

Effect of the Invention

According to the present invention, a red eye is surely separated from a gold eye, and a separated gold eye is converted into a red eye. Thereby, a red eye correcting process is equally performed to both a red eye and a red eye converted into a gold eye.

BEST MODE FOR CARRYING OUT THE INVENTION

The invention will now be described based on the preferred embodiments, which do not intend to limit the scope of the present invention, but exemplify the invention. All of the features and the combinations thereof described in the embodiment are not necessarily essential to the invention.

Figure 1:
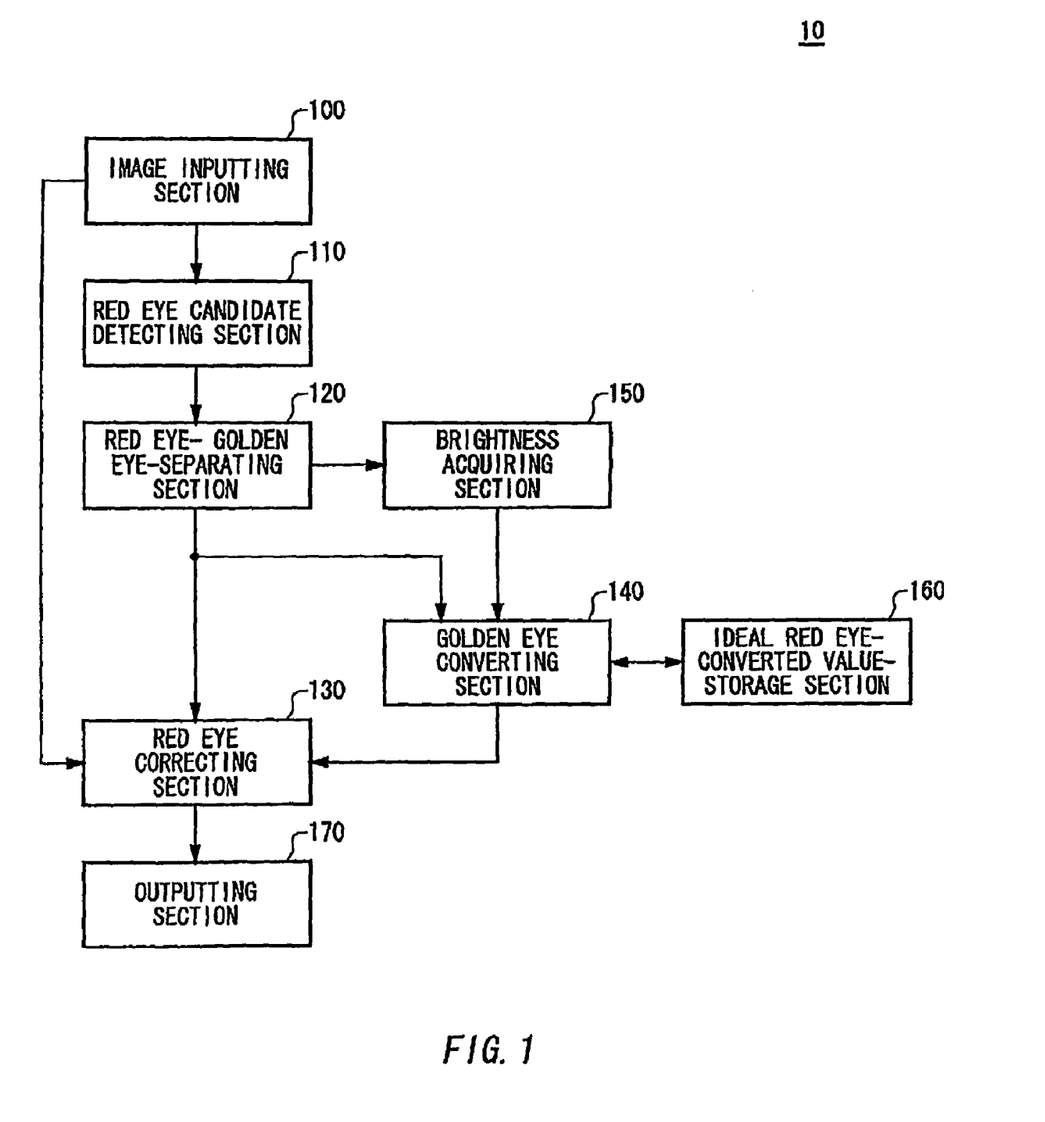
FIG. 1 is a block diagram showing a functional constitution of an image processing apparatus 10.

FIG. 1 shows one example of a functional constitution of an image processing apparatus 10 regarding one embodiment of the present invention. The image processing apparatus 10 includes an image inputting section 100, a red eye candidate detecting section 110, a red eye-gold eye separating section 120, a red eye correcting section 130, a gold eye converting section 140, a brightness acquiring section 150, an ideal red eye-converted value-storage section 160, and an outputting section 170. The image processing apparatus 10 regarding the present embodiment has a purpose of performing a red eye correction to both a red eye and a gold eye converted into a red eye by using one red eye connecting process in such a manner that a red eye is surly separated from a gold eye, and then the gold eye is converted into a red eye.

Images are inputted to the image inputting section 100 from outside. The images inputting section 100 reads images printed on pictures, a paper medium, and the like. Thus, images are inputted to the image inputting section 100 as image data from outside. Additionally, such image data may be inputted to the image inputting section 100 via a memory medium such as a semiconductor memory or a network such as LAN and internet. Then, the image inputting section 100 transmits such inputted image data to the red eye candidate detecting section 110 and the red eye correcting section 130.

The red eye candidate detecting section 110 detects a red eye candidate included in images received from the images inputting section 100. Specifically, the red eye candidate detecting section 110 detects a red eye candidate having a red color included in a predetermined color range from the above mentioned images by using a predetermined detecting threshold value which detects a red color. Furthermore, in this case, a color range of red color may be set in a range such that a red eye included in images can be appropriately detected. Additionally, the red eye candidate detecting section 110 may set a color range of a red color by means of a machine leaning. Moreover, the red eye candidate detecting section 110 may search a red eye candidate from images by template matching of a red eye of a specified configuration and size having a predetermined color range.

Herein, the red eye candidate detecting section 110 may detect a red eye based on at least one kind of parameter when searching a red eye. The red eye candidate detecting section 110 may detect a red eye candidate by using a several kinds of a red eye template image which is used in red eye detection. For example, a first one is a number of different sizes of a red eye template image. A second one is a number of different configurations of a red eye template image. A third one is a number of different type of hue of a red eye template image. Further, the red eye candidate detecting section 110 may move a red eye template image in a predetermined pitch width on image. The red eye candidate detecting section 110 may have preliminarily information regarding a number of different pitch width and movement start position for the case that a red eye template image is moved on image. For example, the red eye candidate detecting section 110 may detect a red eye candidate from image by varying a parameter in series.

Specifically, the red eye candidate detecting section 110 try to detect a red eye candidate in such a manner of searching red eye in image by using a first parameter. In the case that the red eye candidate detecting section 110 could not detect a red eye candidate by using the first parameter, the red eye candidate detecting section 110 tries to detect a red eye candidate by switching the first parameter to a second parameter. For example, the red eye candidate detecting section 110 detects a red eye candidate by searching a red eye in such a manner of moving a searching position of a red eye lamp plate in a first pixel pitch on image. In the case that the red eye candidate detecting section 110 could not detect a red eye candidate in the first pixel pitch, the red eye candidate detecting section 110 detects a red eye candidate in such a manner of moving a red eye template image in a second pixel pitch which is different from the first pixel pitch. The red eye candidate detecting section 110 may remove a red eye template image by varying pixel pitch in series until a red eye candidate is detected. Herein, the red eye candidate detecting section 110 may use a pixel pitch such that a search position searched in the first pixel pitch is not overlapped with a pixel pitch such that a search position searched in the second pixel pitch.

Additionally, the red eye candidate detecting section 110 may judge whether or not a position of detected plural red eye candidates is included in a facial image. Specifically, the red eye candidate detecting section 110 detects whether or not a fiscal image exists around the periphery of a detected red eye candidate. For example, the red eye candidate detecting section 110 judges whether or not a red eye candidate is located on the area corresponding to eyes of a facial image based on a relationship between positions of outline of eyebrow, nose, mouth, ears, mustache, beard, and face and a position of a red eye candidate. Furthermore, the red eye candidate detecting section 110 may judge that an imaging object is a facial image by rotating the imaging object around the periphery of a detected red eye candidate in the case that the imaging object has a symmetrical shape. Furthermore, the red eye candidate detecting section 110 may judge whether or not a facial area extracted from image is located on the area corresponding to eyes of a facial area extracted by the red eye candidate. Then, the red eye candidate detecting section 110 may select a red eye candidate in which a red eye correction is to be performed in the case that the red eye candidate detecting section 110 judges that such red eye candidate is located on eyes of a face. The red eye candidate detecting section 110 transmits information indicating a position of image of a detected red eye candidate and information indicating a color of a detected red eye candidate to the red eye-gold eye separating section 120 in accordance with image.

The red eye-gold eye separating section 120 judges whether a red eye candidate detected by the red eye candidate detecting section 110 is a red eye or a gold eye specified in a predetermined color range. Specifically, the red eye-gold eye separating section 120 judges whether a red eye candidate detected by the red eye candidate detecting section 110 is a red eye or a gold eye by using a red eye separating threshold value of which level of R component in proportion to at least one of G component and B component is higher than a detecting threshold value used by the red eye candidate detecting section 110. Furthermore, the red eye-gold eye separating section 120 may judge whether a red eye candidate detected by a red eye candidate detecting section 110 is a red eye or a gold eye based on at least one of a first feature value, a second feature value, or a third feature value. Herein, the first feature value indicates a ratio of an average value of G component level in proportion to a sum total of an average value of R component level, G component level, and B component level of pixels included in the red eye candidate detected by the red eye candidate detecting section 110. The second feature value indicates an average value of pixels of R component level included in the red eye candidate detected by the red eye candidate detecting section 110. The third feature value indicates a dispersion of R component level of pixels included in the red eye candidate detected by the red eye candidate detecting section 110.

More specifically, the red eye-gold eye separating section 120 may judge that a red eye candidate detected by a red eye candidate detecting section 110 is a gold eye in the case that the first feature value is greater than a predetermined first threshold value, and the second feature value is greater than a predetermined second threshold value. The red eye-gold eye separating section 120 may judge that a red eye candidate detected by a red eye candidate detecting section 110 is a gold eye in the case that the first feature value is smaller than a predetermined first threshold value, and the third feature value is smaller than a predetermined third threshold value. The red eye-gold eye separating section 120 may judge that a red eye candidate detected by a red eye candidate detecting section 110 is a red eye in the case that the first feature value is greater than a predetermined first threshold value, the second feature value is smaller than a predetermined second threshold value, and the third feature value is smaller than a predetermined third threshold value.

Additionally, the red eye-gold eye separating section 120 may judge that a red eye candidate detected by a red eye candidate detecting section 110 is a red eye in the case that the first feature value is smaller than a predetermined first threshold value, and the third feature value is greater than a predetermined third threshold value. Furthermore, the red eye-gold eye separating section 120 may judge that a red eye candidate detected by a red eye candidate detecting section 110 is a red eye in the case that the first feature value is greater than a predetermined first threshold value, the second feature value is smaller than a predetermined second threshold value, and the third feature value is greater than a predetermined third threshold value. The red eye-gold eye separating section 120 transmits a position in image of a red eye candidate judged as a gold eye to the gold eye converting section 140 and a brightness acquiring section 150 in accordance with a corresponding image. Furthermore, the red eye-gold eye separating section 120 transmits information indicating a position in image of a red eye candidate judged as a red eye to the red eye correcting section 130. What is more, the red eye-gold eye separating section 120 transmits information regarding an area of a red eye judged as a red eye or a gold eye, or brightness and a color of pixel in an area of a gold eye to the gold eye converting section 140 and the red eye correcting section 130.

The ideal red eye-converted value-storage section 160 stores a conversion value of a color for converting a gold eye into a red eye in accordance with a brightness of a red eye candidate which was judged as a gold eye by the red eye-gold eye separating section 120. The ideal red eye-converted value-storage section 160 may store a conversion value of a color in accordance with an average of brightness of pixel included in an area of a red eye candidate which was judged as a gold eye by the red eye-gold eye separating section 120. A conversion value of a color stored in the ideal red eye-converted value-storage section 160 may be a respective conversion value of R component level, G component level, and B component level. The ideal red eye-converted value-storage section 160 transmits information indicating a conversion value of a color to the gold eye converting section 140 based on a control of the gold eye converting section 140.

The brightness acquiring section 150 acquires a brightness of a gold eye candidate which was judged as a gold eye by the red eye-gold eye separating section 120. The brightness acquiring section 150 transmits information regarding brightness to the gold eye converting section 140. The gold eye converting section 140 converts a color of the red eye candidate, which was judged as a gold eye by the red eye-gold eye separating section 120, into a color, which is judged as a red eye by the red eye-gold eye separating section 120. The gold eye converting section 140 converts a color of the red eye candidate, which was judged as a gold eye by the red eye-gold eye separating section 120, into a color, which is judged as a red eye by the red eye-gold eye separating section 120 based on the above mentioned first feature value, second feature value, and third feature value, together with the above mentioned first separating threshold value, second separating threshold value, and third separating threshold value. The gold eye converting section 140 extracts a conversion value of a color stored in the ideal red eye-converted value-storage section 160 in accordance with a brightness acquired by the brightness acquiring section 150. The gold eye converting section 140 may extract a conversion value of a color stored in the ideal red eye-converted value-storage section 160 in accordance with a brightness which was appeared most frequently during a course of analyzing information indicating brightness received from the brightness acquiring section 150. The gold eye converting section 140 converts a color of the red eye candidate, which was judged as a gold eye by the red eye-gold eye separating section 120, into a color, which is judged as a red eye by the red eye-gold eye separating section 120 by using a conversion value of an extracted color. The gold eye converting section 140 transmits information regarding a position and a color of a red eye candidate, which was gained after a gold eye was converted into a red eye, to the red eye correcting section 130.

The red eye correcting section 130 performs a red eye correction to a red eye candidate included in image received from the image inputting section 100. Specifically, the red eye correcting section 130 performs a red eye correction to a red eye candidate of which color was converted by the gold eye converting section 140. Furthermore, the red eye correcting section 130 equally perform a red eye correction to two red eye candidates. Of these, one is a red eye candidate which was judged as a red eye by the red eye-gold eye separating section 120, while the other is a red eye candidate of which color was converted by a gold eye converting section 140 as the red eye candidate was judged as a gold eye by the red eye-gold eye separating section 120. The red eye correcting section 130 performs a red eye correction to image data, and transmits such image data to the output inputting section 170. The outputting unit 170 outputs image data. Herein, an image displaying apparatus such as monitor for displaying image data, a writing apparatus for writing image data to a recording medium such as DVD, and a communicating section for transmitting image data to other image processing apparatus are one example of the outputting section 170. Additionally, in the case that the outputting section 170 is a monitor, the outputting section 170 may display image data by converting a received image data into a visible image data.

The image processing apparatus 10 regarding an embodiment of the present invention can automatically separate a gold eye included in a red eye candidate detected based on a predetermined feature value and separating threshold value from a red eye having a predetermined color by detecting a red eye candidate included in image based on a specified detecting threshold value. Accordingly, a red eye candidate is surely detected by using a detecting threshold value which widely detects a red color included in image, and then a red can be automatically separated from a gold eye.

According to the image processing apparatus 10 regarding an embodiment of the present invention, after a gold eye was separated from a red eye, the gold eye is converted into a red eye. Then, a red eye correction can be equally performed to both the red eye and the gold eye, which was converted into a red eye. As described above, even though a gold eye is mixed with a red eye, a red eye correction can be appropriately performed to a gold eye. In this way, a conventional drawback such that an appropriate red eye correction can hardly be performed to a gold eye can be eliminated. Consequently, this improvement can eliminate a possibility that user senses a discomfort at images performed by a red eye correction when he or she saw the images.

Figure 2:
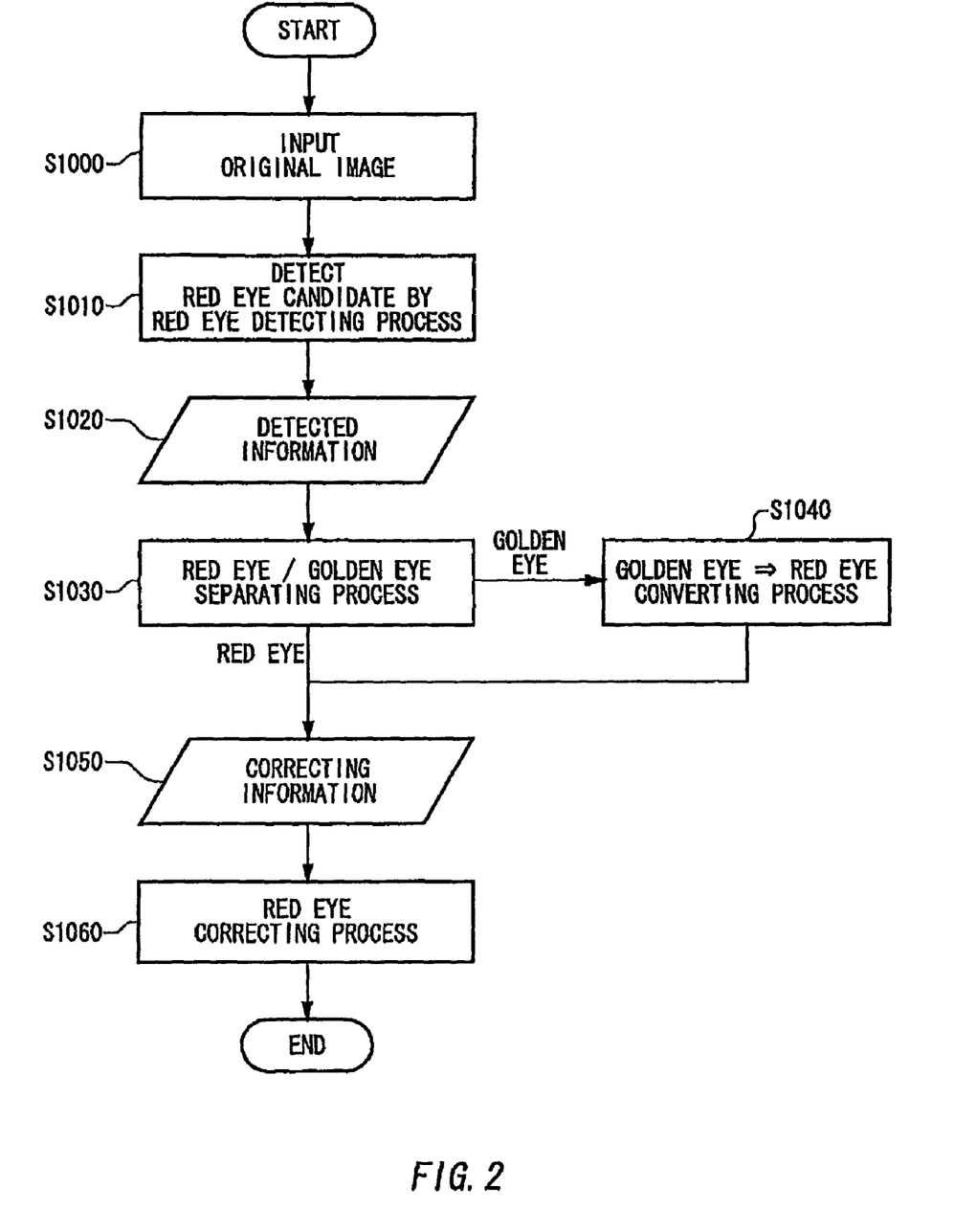
FIG. 2 is a process flowchart showing a process of an image processing apparatus 10.

FIG. 2 shows one example of a process flowchart in a process of an image processing apparatus 10 of an embodiment of the present invention. Firstly, an image inputting section 100 inputs original images to the image processing apparatus 10 (S1000). Herein, the original images are one example of images inputted to the image processing apparatus 10. The image inputting section 100 transmits the inputted original image to the red eye candidate detecting section 110. The red eye candidate detecting section 110 detects a red eye candidate included in the original images received from the images inputting section 100 in a red eye detecting process by using a predetermined detecting threshold value which detects a red color (S1010). Then, the red eye candidate detecting section 110 transmits information indicating a position of image of a detected red eye candidate to the red eye-gold eye separating section 120 in accordance with image (S1020).

The red eye-gold eye separating section 120 divides a red eye candidate detected by the red eye candidate detecting section 110 into a red eye and a gold eye (S1030). The red eye-gold eye separating section 120 transmits information indicating a position of a separated gold eye to the gold eye converting section 140 in accordance with a corresponding image. Furthermore, the red eye-gold eye separating section 120 transmits information regarding a position in image of a separated red eye and a color of a separated red eye to the red eye correcting section 130. The gold eye converting section 140 converts a red eye, which was separated in the red eye-gold eye separating section 120, into a color, which is judged as a red eye by the red eye-gold eye separating section 120 (S1040). The gold eye converting section 140 transmits correction information regarding a color of gold eye converted into a red eye to the red eye correcting section 130 in accordance with a corresponding image (S1050). The red eye correcting section 130 performs a red eye correction to a red eye candidate in the image, which should be corrected to a red eye, based on information received from the red eye-gold eye separating section 120 and the gold eye converting section 140 (S1060).

Figure 3:
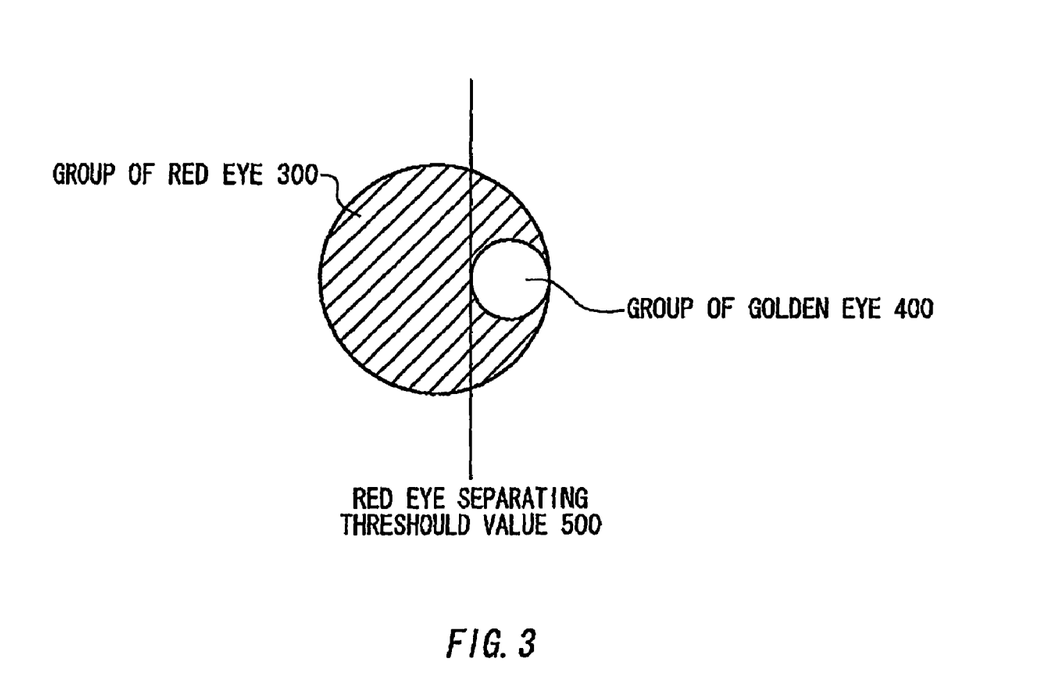
FIG. 3 is a diagram showing an example of a red eye separating threshed value 500.

FIG. 3 is one example of a red eye separating threshed value 500 regarding one embodiment of the present invention. The red eye candidate detecting section 110 detects a red eye candidate included in images by using a predetermined detecting threshold value. In this case, the detecting threshold value may be set as a value capable of accurately detecting a red eye candidate which should be corrected to a red eye. For example, a level of R component may be used as the detecting threshold value. This is because a red eye candidate should be accurately detected by using a level of R component as a detection of a red eye candidate more primarily than a level of G component and B component. Herein, a group of a red eye candidate detected from images by the red eye candidate detecting section 110 by using the detecting threshold value is defined as a group 300 of a red eye. The group 300 of a red eye includes also a group 400 of a gold eye having a gold color including G component and B component in addition to R component, because the red eye candidate detecting section 110 detects a red eye candidate by using the detecting threshold value specified in a level of R component. The red eye-gold eye separating section 120 separates a group 400 of a gold eye from a group 300 of a red eye detected by the red eye candidate detecting section 110 by using a red eye separating threshold value 500 of which level of R component in proportion to at least one of G component and B component is higher than the detecting threshold value.

Figure 4:
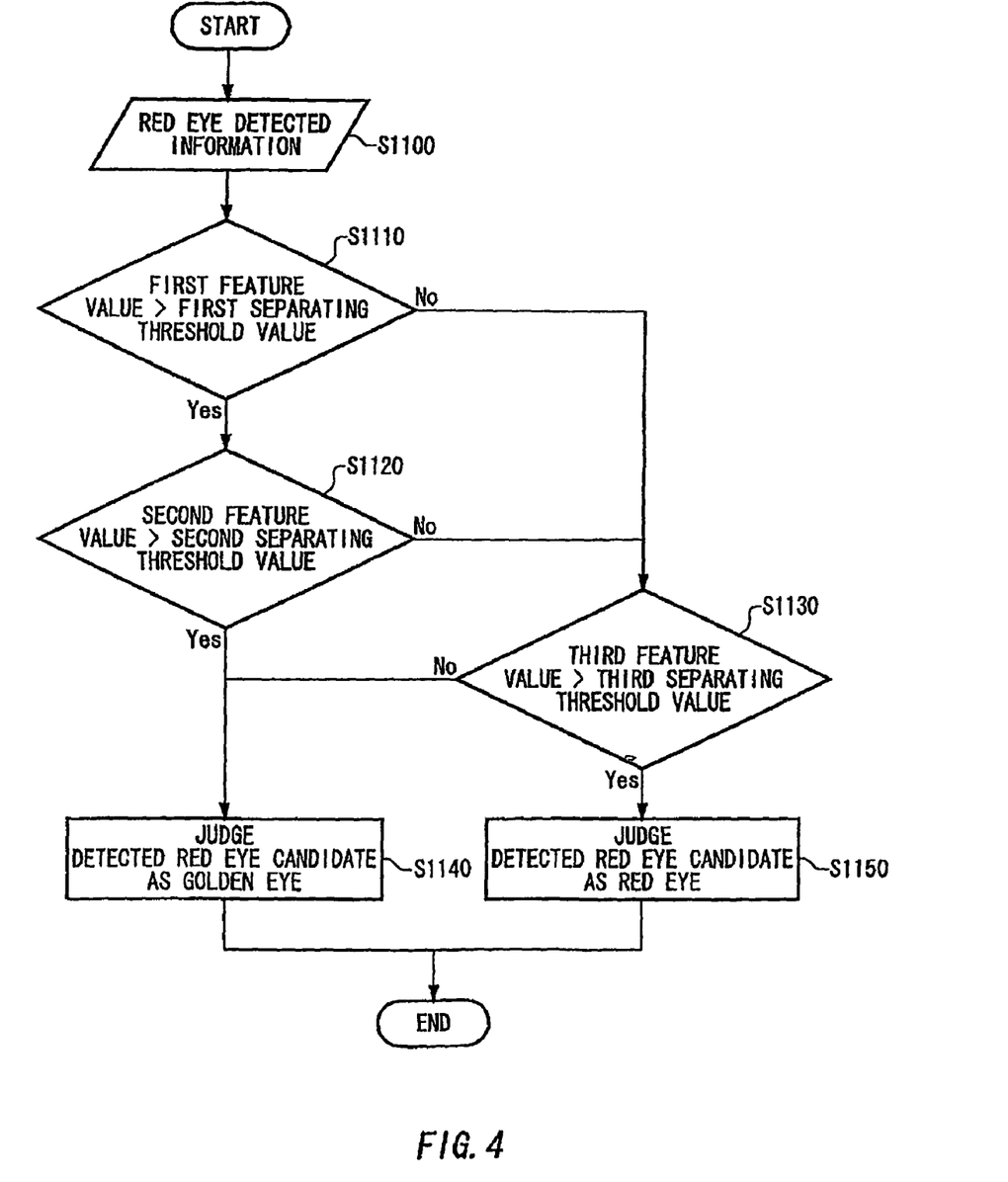
FIG. 4 is a process flowchart showing a process of a red eye-gold eye separating section 120.

FIG. 4 shows one example of a process flowchart in a red eye-gold eye separating section 120 regarding one embodiment of the present invention. Firstly, the red eye-gold eye separating section 120 receives information regarding a red eye candidate detected by the red eye candidate detecting section 110 from the red eye candidate detecting section 110 (S1100). Specifically, the information regarding a red eye candidate is a red eye detecting information, which is information regarding a position to images of a detected red eye candidate and a color of a detected red eye candidate. The red eye-gold eye separating section 120 judges whether a red eye candidate detected by a red eye candidate detecting section 110 is a red eye or a gold eye based on at least one of a first feature value, a second feature value, or a third feature value. Herein, the first feature value indicates a ratio of an average value of G component level in proportion to a sum total of an average value of R component level, G component level, and B component level of pixels included in the red eye candidate detected by the red eye candidate detecting section 110. The second feature value indicates an average value of pixels of R component level included in the red eye candidate detected by the red eye candidate detecting section 110. The third feature value indicates a dispersion of R component level of pixels included in the red eye candidate detected by the red eye candidate detecting section 110.

Specifically, firstly, the red eye-gold eye separating section 120 compares the first feature value with a predetermined first separating threshed value in order to determine which is larger or smaller (S1110). In the case that the first feature value is larger than the first separating threshed value (S1110: Yes), the red eye-gold eye separating section 120 compares the second feature value with a predetermined second separating threshed value in order to determine which is larger or smaller (S1120). In the case that the second feature value is larger than the second separating threshed value (S1120: Yes), the red eye-gold eye separating section 120 judges that a red eye candidate detected by the red eye candidate detecting section 110 is a gold eye (S1140).

On the other hand, in the case that the first feature value is smaller than the first separating threshed value (S1110: No), and the second feature value is smaller than the second separating threshed value (S1120: No), the red eye-gold eye separating section 120 compares the third feature value with the third separating threshed value in order to determine which is larger or smaller (S1130). In the case that the third feature value is smaller than the third separating threshed value (S1130: No), the red eye-gold eye separating section 120 judges that a red eye candidate detected by the red eye candidate detecting section 110 is a gold eye (S1140). Furthermore, in the case that the third feature value is larger than the third separating threshed value (S1130: Yes), the red eye-gold eye separating section 120 judges that a red eye candidate detected by the red eye candidate detecting section 110 is a red eye (S1150).

Figure 5:
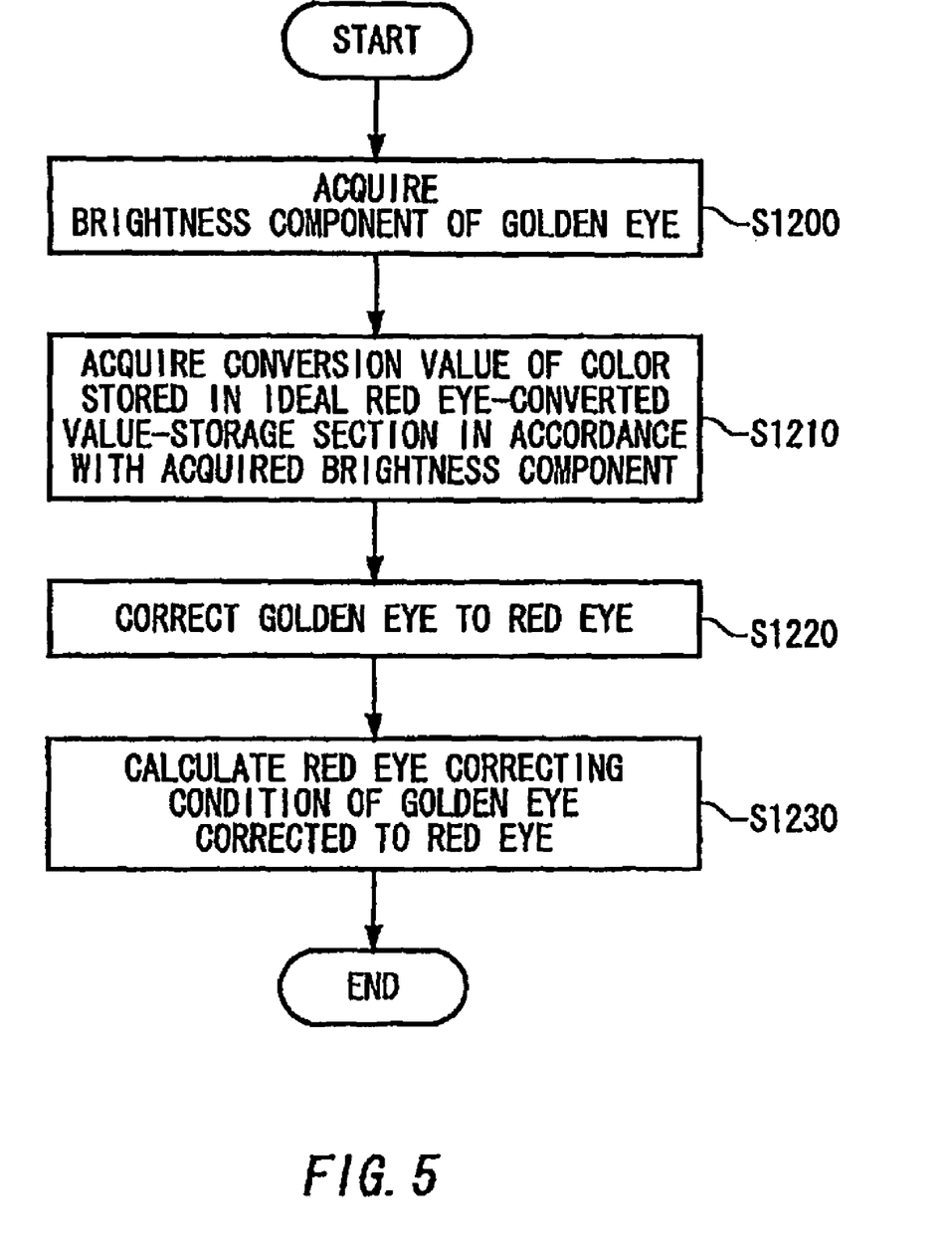
FIG. 5 is a process flowchart showing a process of a gold eye converting section 140.

FIG. 5 shows one example of a process flowchart in a gold eye converting section 140 regarding one embodiment of the present invention. Firstly, the brightness acquiring section 150 acquires a brightness component of a gold eye separated in the red eye-gold eye separating section 120 (S1200). Herein, the brightness component is one example of brightness. The brightness acquiring section 150 transmits the acquired brightness component to the gold eye converting section 140. The gold eye converting section 140 acquires a conversion value of a color stored in an ideal red eye-converted value-storage section 160 in accordance with a brightness component acquired from the brightness acquiring section 150 (S1210). Then, the gold eye converting section 140 corrects a color of the red eye candidate, which was judged as a gold eye by the red eye-gold eye separating section 120 to a red eye by using a conversion value of a color received from the ideal red eye-converted value-storage section 160 (S1220). The gold eye converting section 140 transmits information indicating a color of a gold eye, which was corrected to a color of a red eye, to the red eye correcting section 130. The red eye correcting section 130 calculates a red eye correcting condition of a gold eye, which was corrected to a color of a red eye, based on information indicating a color of a gold eye which was corrected to a color of a red eye received from the gold eye converting section 140 (S1230).

For example, the red eye correcting section 130 calculates a conversion value in which a red eye is converted to a pupil eyes for the purpose that a gold eye corrected to a color of a red eye is converted to a color of a pupil eye in which a red eye is not caused. The red eye correcting section 130 performs a red eye correcting process to images including a red eye candidate based on a calculated red eye correcting condition.

Figure 6:
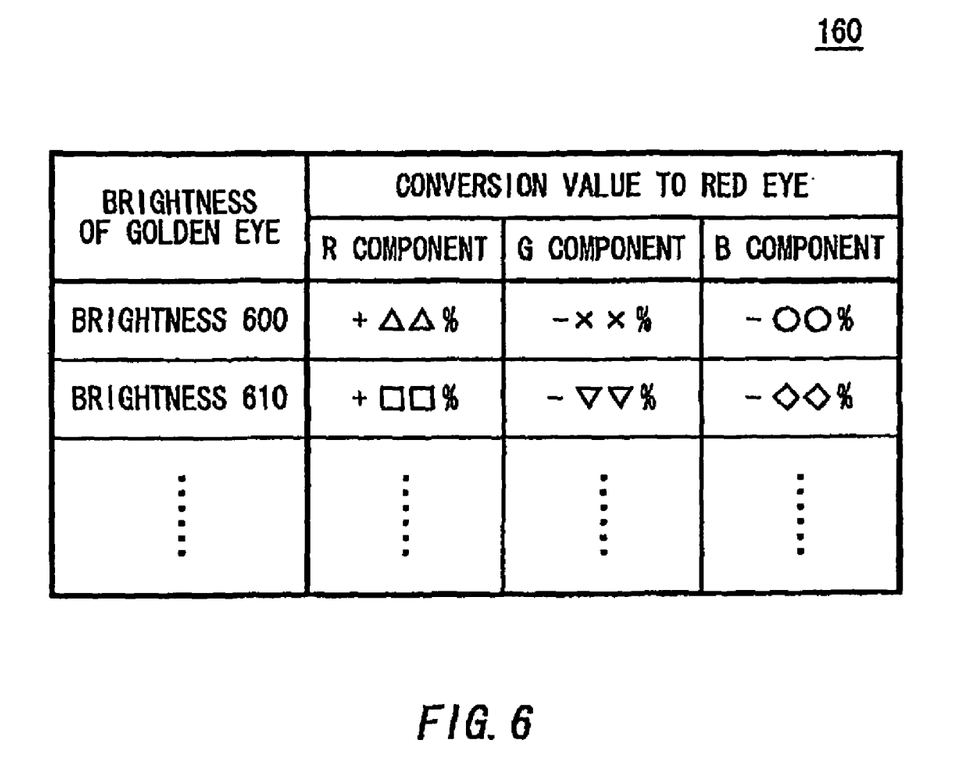
FIG. 6 is a diagram showing a data component of an ideal red eye-converted value-storage section 160.

FIG. 6 shows one example of a data component of an ideal red eye-converted value-storage section 160 regarding one embodiment of the present invention. The ideal red eye-converted value-storage section 160 stores a conversion value of a color in accordance with a brightness of a red eye candidate which was judged as a gold eye by the red eye-gold eye separating section 120. For example, an ideal red eye-converted value-storage section 160 stores a variation of levels of R component, G component, and B component in accordance with brightness 600. Herein, the variation of levels R component, G component, and B component is a variation required for converting a color of a gold eye having the brightness 600 into a color judged as a red eye by the red eye-gold eye separating section 120. Similarly, the ideal red eye-converted value-storage section 160 stores a variation of levels of R component, G component, and B component in accordance with brightness 610. Herein, the variation of levels R component, G component, and B component is a variation required for converting a color of a gold eye having the brightness 610 into a color judged as a red eye by the red eye-gold eye separating section 120. The gold eye converting section 140 may converts a color of a gold eye into a predetermined color of a red eye based on a conversion value of a color stored in the ideal red eye-converted value-storage section 160. After a color of gold eye was converted into a color of red eye by the gold eye converting section 140, a red eye correcting process is performed to the gold eye by the red eye correcting section 130. Then, the gold eye is corrected to a color of eyes in which a red eye effect and a gold eye are not caused.

The ideal red eye-converted value-storage section 160 regarding an embodiment of the present invention stores a conversion value of a color for converting a color of a gold eye into a predetermined color of a red eye in accordance with brightness of a gold eye. The gold eye converting section 140 can convert a color of a gold eye into a color of a red eye in accordance with a conversion value of a color stored in the ideal red eye-converted value-storage section 160. Furthermore, after a gold eye was converted to a red eye, a red eye correcting process can be preformed to the gold eye by the red eye correcting section 130. As described above, unlike the case that an area of a gold eye portion is uniformly converted to a color of gold eye, a color of a gold eye can be converted to a color of a red eye under that condition that a gradation of areas of a gold eye portion is maintained. Under this condition, the red eye correcting section 130 performs a red eye correcting process to a gold eye, which was converted to a color of a red eye by the gold eye converting section 140. Consequently, a color of a gold can be corrected to a color of eyes showing a natural state.

Figure 7:
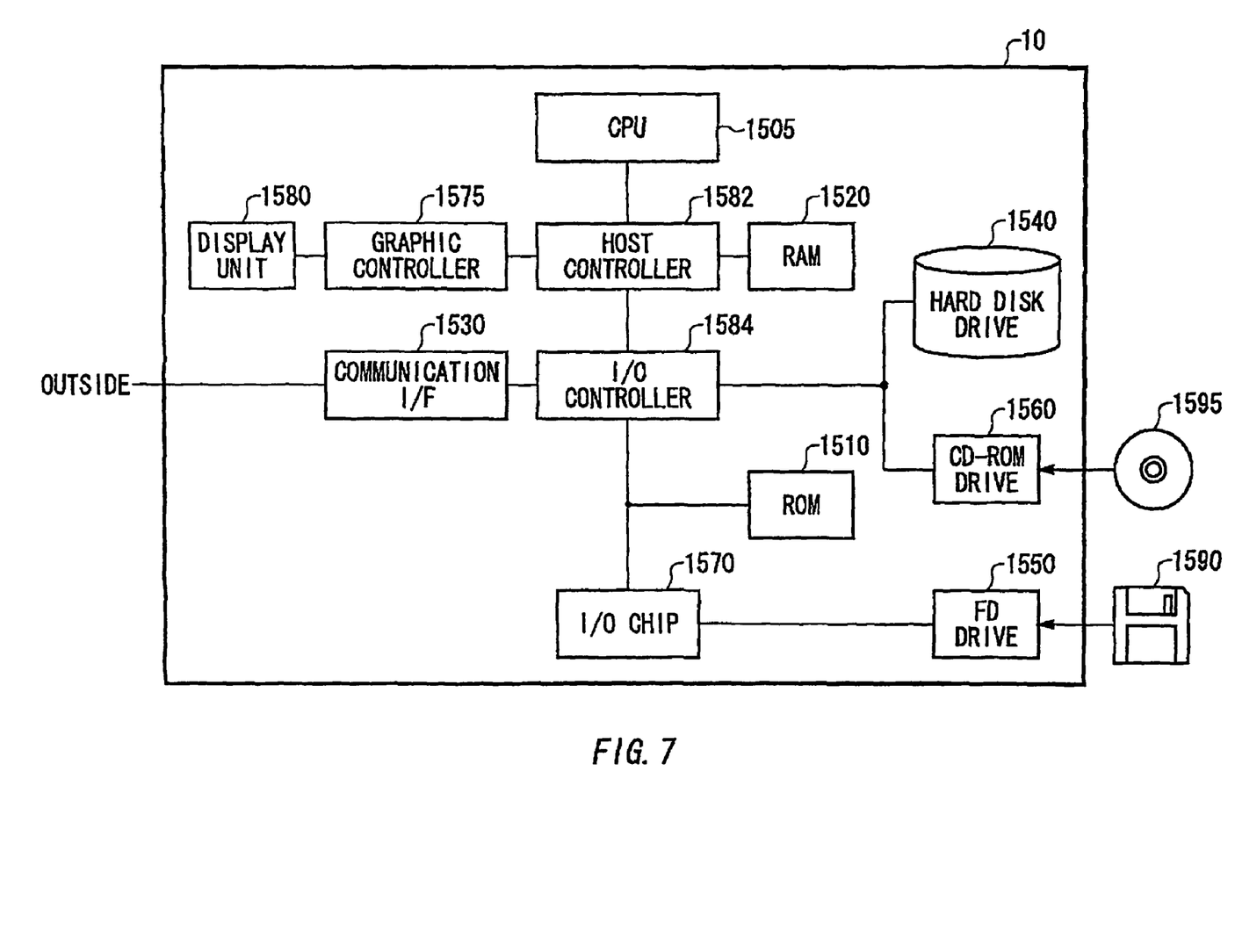
FIG. 7 is a block diagram showing a hardware construction of an image processing apparatus 10.

FIG. 7 shows an example of hardware configuration of the image processing apparatus 10. The image processing apparatus 10 includes a CPU periphery having a CPU 1505, a RAM 1520, a graphic controller 1575 and a display 1580 which are connected through a host controller 1582 each other, an input/output unit having a communication interface 1530, a hard disk drive 1540 and a CD-ROM drive 1560 which are connected to the host controller 1582 through an input/output controller 1584 and a legacy input/output unit having a ROM 1510, a flexible disk drive 1550 and an input/output chip 1570 which are connected to the input/output controller 1584.

The host controller 1582 connects the RAM 1520 to the CPU 1505 and the graphic controller 1575 which access the RAM 1520 with a high transfer ratio. The CPU 1505 operates according to the programs stored in the ROM 1510 and the RAM 1520 to control each unit. The graphic controller 1575 obtains image data generated on a frame buffer provided in the RAM 1520 by the CPU 1505 and displays the same on the display 1580. Alternatively, the graphic controller 1575 may include therein a frame buffer for storing image data generated by the CPU 1505.

The input/output controller 1584 connects the host controller 1582 to the hard disk drive 1540, the communication interface 1530 and the CD-ROM drive 1560 which are relatively high-speed input/output units. A communication interface 1530 communicates other deice through network. The hard disk drive 1540 stores the program and data used by the CPU 1505 in the image processing apparatus 10. The CD ROM drive 1560 reads the program or data from the CD-ROM 1595 and provides the same to the hard disk drive 1540 through the RAM 1520.

The ROM 1510, and the flexible disk drive 1550 and input/output chip 1570 which are relatively low-speed input/output units are connected to the input/output controller 1584. The ROM 1510 stores a boot program executed by the monitoring apparatus 110 at activating and a program depending on the hardware of the image processing apparatus. The flexible disk drive 1550 reads the programs or data from a flexible disk 1590 and provides the same to the hard disk drive 1540 and the communication interface 1530 through the RAM 1520. The input/output chip 1570 connects various input/output units through the flexible disk drive 1550 and such as a parallel port, a serial port, a keyboard port and a mouse port.

An image processing program stored on a computer readable medium provided to the hard disk drive 1540 through RAM 1520 is stored in a recording medium, such as the flexible disk 1590, the CD-ROM 1595, or an IC card and provided by the user. The image processing program is read from the recording medium, installed into the hard disk drive 1540 in the image processing apparatus 10 through RAM 1520, and executed by the CPU 1505. The image processing program installed into the image processing apparatus 10 and executed by the CPU 1505 causes the image processing apparatus 10 to function as the image inputting section 100, the red eye candidate detecting section 110, the red eye-gold eye separating section 120, the red eye correcting section 130, the gold eye converting section 140, the brightness acquiring section 150, the ideal red eye-converted value-storage section 160, and the outputting section 170.

While the present invention has been described with the embodiment, the technical scope of the invention not limited to the above described embodiment. It is apparent to person skilled in the art that various alternations and improvements can be added to the above-described embodiment. It is apparent from the scope of the claims that the embodiment added such alternation or improvements can be included in the technical scope of the invention.

The invention claimed is:

1. An image processing apparatus comprising:
a red eye candidate detecting section that detecting a red eye candidate included in images;
a red eye-gold eye separating section that judging whether a red eye candidate detected by the red eye candidate detecting section is either a red eye or a gold eye respectively specified in a predetermined color range;

a gold eye converting section that converts a color of the red eye candidate, which was judged as a gold eye by the red eye-gold eye separating section, into a color, which is judged as a red eye by the red eye-gold eye separating section; and a red eye correcting section performs a red eye correcting process to a color of the red eye candidate converted by the gold eye converting section.

2. The image processing apparatus as set forth in claim 1, wherein the red eye correcting section equally performs a red eye correcting process to a red candidate, which was judged as a red eye by the red eye-gold eye separating section, and a red candidate of which color was converted by a gold eye converting section since the red eye candidate was judged as a gold eye by the red eye-gold eye separating section.

3. The image processing apparatus as set forth in claim 1 comprising:

an ideal red eye-converted value-storage section that stores a conversion value of a color in accordance with a brightness of a red eye candidate which was judged as a gold eye by the red eye-gold eye separating section;

the brightness acquiring section that acquires a brightness of a red eye candidate which was judged as a gold eye by the red eye-gold eye separating section, wherein the gold eye converting section converts a color of the red eye candidate, which was judged as a gold eye by the red eye-gold eye separating section, into a color, which is judged as a red eye by the red eye-gold eye separating section by using a conversion value of a color stored in the ideal red eye-converted value-storage section in accordance with a brightness acquired by said brightness acquiring section.

4. The image processing apparatus as set forth in claim 1, wherein the red eye-gold eye separating section detects a red eye candidate having a red color included in a predetermined color range from images by using a predetermined detecting threshold, and the red eye-gold eye separating section judges whether a red eye candidate detected by the red eye candidate detecting section is either red eye or a gold eye by using a red eye separating threshold value of which level of R component in proportion to at least one of G component and B component is higher than said detecting threshold value.

5. The image processing apparatus as set forth in claim 1, wherein the red eye-gold eye separating section judges whether a red eye candidate detected by the red eye candidate detecting section is either red eye or a gold eye based on at least one of a first feature value, a second feature value or a third feature value, the first feature value indicates a ratio of an average value of G component level in proportion to a sum total of an average value of R component level, G component level, and B component level of pixels included in the red eye candidate detected by the red eye candidate detecting section, the second feature value indicates an average value of pixels of R component level included in the red eye candidate detected by the red eye candidate detecting section, and the third feature value indicates a dispersion of R component level of pixels included in the red eye candidate detected by the red eye candidate detecting section.

6. The image processing apparatus as set forth in claim 1, wherein the red eye-gold eye separating section judges that a red eye candidate detected by a red eye candidate detecting section is a gold eye in the case that the first feature value is greater than a predetermined first threshold value, and the second feature value is greater than a predetermined second threshold value.

7. The image processing apparatus as set forth in claim 5, wherein the red eye-gold eye separating section judges that a red eye candidate detected by a red eye candidate detecting section is a gold eye in the case that the first feature value is smaller than a predetermined first threshold value, and the third feature value is smaller than a predetermined third threshold value.

8. The image processing apparatus as set forth in claim 5, wherein the red eye-gold eye separating section judges that a red eye candidate detected by a red eye candidate detecting section is a gold eye in the case that the first feature value is greater than a predetermined first threshold value, the second feature value is smaller than a predetermined second threshold value, and the third feature value is smaller than a predetermined third threshold value.

9. An image processing method comprising: step of detecting a red eye candidate that detecting a red eye candidate included in images;

separating a red eye from a gold eye that judging whether a red eye candidate detected in the step of detecting the red eye candidate is a red eye or a gold eye respectively specified in a predetermined color range;

converting a gold eye into a red eye that converts a color of the red eye candidate, which was judged as a red eye in the step of judging of a red eye from a gold eye, into a color, which is judged as a red eye in the red eye-gold eye separating section; and correcting a red eye that performing a red eye correction to a color of the red eye candidate converted in the step of converting a gold eye into a red eye.

10. A non-transitory computer readable medium storing thereon an image processing program for the image processing apparatus, which applies image processing to image, the image processing program allowing the image processing apparatus to functions as:

a red eye candidate detecting section that detecting a red eye candidate included in images;

a red eye-gold eye separating section that judging whether a red eye candidate detected by the red eye candidate detecting section is either red eye or a gold eye respectively specified in a predetermined color range;

a gold eye converting section that converts a color of the red eye candidate, which was judged as a red eye by the red eye-gold eye separating section, into a color, which is judged as a red eye by the red eye-gold eye separating section; and a red eye correcting section that performing a red eye correction to a color of the red eye candidate converted by the gold eye converting section.

* * * * *